US012760549B2

(12) United States Patent
Lassesen

(10) Patent No.: US 12,760,549 B2
(45) Date of Patent: Oct. 13, 2026

(54) FLANGE ELEMENT

(71) Applicant: TP-Products AS, Drammen (NO)

(72) Inventor: Sjur Lassesen, Stabekk (NO)

(73) Assignee: TP-Products AS, Drammen (NO)

( * ) Notice: Subject to any disclaimer, the term of this patent is extended or adjusted under 35 U.S.C. 154(b) by 113 days.

(21) Appl. No.: 18/845,217

(22) PCT Filed: Jan. 18, 2023

(86) PCT No.: PCT/EP2023/051080
§ 371 (c)(1),
(2) Date: Sep. 9, 2024

(87) PCT Pub. No.: WO2023/169724
PCT Pub. Date: Sep. 14, 2023

(65) Prior Publication Data

US 2025/0188764 A1 Jun. 12, 2025

(51) Int. Cl.
*E04H 12/08* (2006.01)
*F16L 23/032* (2006.01)
*G01M 3/28* (2006.01)

(52) U.S. Cl.
CPC .......... *E04H 12/085* (2013.01); *F16L 23/032* (2013.01); *G01M 3/2815* (2013.01)

(58) Field of Classification Search
CPC ..... E04H 12/085; F03D 13/20; F03D 13/205; F16L 23/032; G01M 3/2815
(Continued)

(56) References Cited

U.S. PATENT DOCUMENTS 2,401,923 A * 6/1946 Gleeson .................. F16L 17/08 220/327
2,412,487 A * 12/1946 Amley .................... F16L 47/14 403/336
(Continued)

FOREIGN PATENT DOCUMENTS

DE 202008006307 U1 * 9/2009 ............. F03D 13/20
EP 2116675 A2 11/2009
(Continued)

OTHER PUBLICATIONS

International Search Report issued in International Application No. PCT/EP2023/051080, mailed Mar. 28, 2023 (3 pages).
(Continued)

*Primary Examiner* — James M Ference
(74) *Attorney, Agent, or Firm* — Osha Bergman Watanabe & Burton LLP

(57) ABSTRACT

An annular flange element for connection of tubular elements includes an inner periphery arranged around a central axis, an outer periphery arranged around the central axis, and an outer flange part extending radially outward toward the outer periphery. The outer flange part includes an outer section of a rear side and an outer front side with an outer front surface for connection to a cooperating structure. The annular flange element includes an inner flange part extending radially inward toward the inner periphery. The inner flange part includes an inner section of the rear side and an inner front side with an inner front surface for connection to the cooperating structure. The annular flange element includes an attachment part extending from the rear side in a direction opposite the inner and the outer front surface. The attachment part is adapted for secure attachment to a tubular element. The inner and outer flange parts are partially divided by at least one annular groove extending between
(Continued)

the inner and outer flange parts from a position between the inner and outer front surfaces towards a position a distance from the rear side.

16 Claims, 7 Drawing Sheets

(58) Field of Classification Search
USPC .......................................................... 52/40
See application file for complete search history.

(56) References Cited

U.S. PATENT DOCUMENTS

| | | | | | |
|---|---|---|---|---|---|
| 2,617,672 | A * | 11/1952 | Nichols | F16D 1/05 | 403/183 |
| 2,739,828 | A * | 3/1956 | Schindler | F16L 23/12 | 285/422 |
| 2,940,779 | A * | 6/1960 | Joseph | F16L 23/032 | 403/183 |
| 3,214,201 | A * | 10/1965 | Fonda | F16L 23/02 | 277/614 |
| 4,019,371 | A * | 4/1977 | Chaplin | F16L 23/167 | 73/49.8 |
| 4,183,562 | A * | 1/1980 | Watkins | E21B 17/0853 | 285/23 |
| 4,403,795 | A * | 9/1983 | Davlin | F16L 27/06 | 285/334.4 |
| 4,410,186 | A * | 10/1983 | Pierce, Jr. | F16L 23/167 | 277/318 |
| 4,428,603 | A * | 1/1984 | Davlin | F16L 23/16 | 285/368 |
| 4,826,220 | A * | 5/1989 | Ross | F16L 23/14 | 333/254 |
| 5,586,417 | A * | 12/1996 | Henderson | E04H 12/085 | 52/741.15 |
| 6,394,507 | B1 * | 5/2002 | Baker | F16L 23/20 | 285/368 |
| 6,467,233 | B1 * | 10/2002 | Maliszewski | F03D 13/20 | 290/55 |
| 6,470,645 | B1 * | 10/2002 | Maliszewski | E04H 12/085 | 52/745.18 |
| 6,532,700 | B1 * | 3/2003 | Maliszewski | F03D 13/10 | 174/45 R |
| 9,003,721 | B1 * | 4/2015 | Jensen | E02D 27/42 | 52/294 |
| 11,873,793 | B2 * | 1/2024 | Lassesen | F03D 13/20 | |
| 2002/0124502 | A1 * | 9/2002 | Henderson | E02D 27/425 | 52/741.15 |
| 2004/0112002 | A1 * | 6/2004 | Wobben | E04H 12/34 | 52/831 |
| 2007/0022703 | A1 * | 2/2007 | Wolf | F03D 13/22 | 52/698 |
| 2007/0102926 | A1 * | 5/2007 | Magnier | F16L 23/032 | 285/368 |
| 2010/0117353 | A1 * | 5/2010 | Ma | E04H 12/085 | 285/412 |
| 2010/0295298 | A1 * | 11/2010 | Haumont | F16J 15/04 | 285/412 |
| 2010/0307097 | A1 * | 12/2010 | Word, III | E04H 12/085 | 52/651.07 |
| 2022/0010779 | A1 * | 1/2022 | Lassesen | F03D 13/25 | |
| 2022/0195988 | A1 * | 6/2022 | Klaassen | F03D 13/10 | |
| 2025/0188764 | A1 * | 6/2025 | Lassesen | E04H 12/085 | |

FOREIGN PATENT DOCUMENTS

| | | | | |
|---|---|---|---|---|
| EP | 2884026 | A2 | 6/2015 | |
| WO | 9317268 | A1 | 9/1993 | |
| WO | 0238890 | A1 | 5/2002 | |
| WO | WO-0238891 | A1 * | 5/2002 | F03D 13/10 |
| WO | 2018139929 | A1 | 8/2018 | |
| WO | 2020089020 | A1 | 5/2020 | |

OTHER PUBLICATIONS

Written Opinion issued in International Application No. PCT/EP2023/051080; Dated Mar. 28, 2023 (7 pages).
Search Report issued in Norwegian Application No. 20220311; Dated Oct. 11, 2022 (2 pages).

* cited by examiner

FLANGE ELEMENT

FIELD OF INVENTION

The present invention is related to a flange element for a flange connection, primarily designed for connecting pipes, tubulars or conical shaped shells exposed to large dynamic forces.

BACKGROUND

Free standing tower structures, such as wind turbine towers, are often large and therefore built by securely connecting together two or more sections of the tower. The tower sections are usually built in lengths that are practical to handle, to transport to the building site and to lift at the building site. Wind turbine towers and similar tower structures are often built by flanging together conically shaped sections of the tower. The loads on the bolted joints that join the sections are of a dynamic nature due to the everyday wind induced loads and vibrations. In addition, extreme short-term high loads can be experienced during storms. Since the most practical way of assembling the tower sections is by using bolted flange connections, a number of different designs have been developed, built and installed over the years, but still the industry is experiencing challenges with the existing bolted connections for such tower structures. In offshore installed wind turbine towers, as well as in the interface between tower and support structure, and in the load bearing structures themselves, dynamic loads on the structure may come from wave and current induced dynamic response.

The most important challenges for bolted flange connection of large tower structures, such as wind turbine towers, are related to structural strength of the flange connection connecting the sections of the tower, fatigue resistance of the flange connection due to dynamic response to the wind loads, and the loosening of the nuts of the bolts of the flange connection during operation due to vibration and global dynamic excitations caused by wind flow passing the tower structure, including the large turbine blades, and waves on the support structure, if offshore.

The tower sections are commonly connected by providing the tower sections with flanges where two corresponding flanges on two adjacent sections are connected with a number of bolts. The loads on the bolts of the joint formed by connecting two adjacent sections of such a tower structure are of dynamic nature due to the constantly varying loads induced by winds and/or water. Consequently, there are several problems with bolted connections of this type. For example, fatigue in bolts since the bolt stresses are dynamic as a function of tower dynamic loads. There can also be problems due to additional bolt loads and local bending of bolts from prying effect on bolts since flanges starts separating partly or entirely under extreme tower loads. Furthermore, there is a problem with nut loosening caused by vibrations and dynamic loads. It is also a problem with water ingress to bolts causing corrosion of the bolts. T-shaped flanges with an inner bolt circle and an outer bolt circle provides higher capacity than L-shaped flanges. It is problem that prior art flanges are normally not used in areas inaccessible for inspection and maintenance and that the external bolt circles often are inaccessible.

An objective of the present invention is to mitigate at least one or some of the problems with prior art solutions.

A further objective of the present invention is to provide a new flange connection for large tower structures that is capable of handling dynamic loads due to wind and/or water passing by the tower structure.

A further objective of the present invention has been to reduce problems with corrosion of bolts that connects the tower sections of a tower structure.

SUMMARY OF THE INVENTION

The invention describes an annular flange element for connection of tubular elements. The flange element comprises an inner periphery arranged around a central axis A, an outer periphery arranged around the central Axis A and an outer flange part extending radially outward toward the outer periphery. The outer flange part comprises an outer section of a rear side and an outer front side with an outer front surface for connection to a cooperating structure. The flange element further comprises an inner flange part extending radially inward toward the inner periphery, wherein the inner flange part comprises an inner section of the rear side and an inner front side with an inner front surface for connection to the cooperating structure. The flange element further comprises an attachment part extending from the rear side in a direction opposite the inner and the outer front surface, wherein the attachment part is adapted for secure attachment to a tubular element. In this text we understand tubular element to mean any kind of elongated hollow object having a rim suitable for connection to a flange element. A cross-section of a tubular element could be circular, oval, polygonal and other shapes and the tubular element could have a conical shape.

According to the invention the inner and outer flange parts are partially divided by at least one annular groove extending between the inner and outer flange parts from a position between the inner and outer front surfaces towards a position a distance from the rear side.

In an embodiment of the flange element at least parts of the outer front surface and the inner front surface have a non-zero angle to a plane, P, perpendicular to the central axis A.

In another embodiment of the flange element the groove is configured to allow flexible movement between the inner and outer front surfaces, such that the non-zero angle of the inner and outer front surfaces relative to the plane (P) may change from non-zero to zero during connection to the cooperating structure.

In yet another embodiment of the flange element the groove is arranged such that the attachment part is in a fixed position during the movement of the inner and outer front surfaces when connected to the cooperating structure.

In yet another embodiment of the flange element the outer flange part further comprises an outer flange wedge comprising an outer flange wedge surface positioned on an outermost section of the outer front surface, and an outer flange heel comprising an outer flange heel surface that is positioned on an innermost section of the outer front surface. The inner flange part further comprises an inner flange wedge comprising an inner flange wedge surface that is positioned on an innermost section of the inner front surface, and an inner flange heel comprising an inner flange heel surface that is positioned on an outermost section of the inner front surface. The inner and outer flange wedge surface makes a wedge surface angle $\gamma 1$ and $\gamma 2$, respectively, with the plane P, and the inner and outer flange heel surface makes an inner and outer heel surface angle $\beta 1$ and $\beta 2$, respectively, with the plane P and wherein an inner and outer abutment surface is positioned near the annular groove on respective sides of the annular groove, and wherein inner and outer flange closing angles, α1 and α2 respectively, are defined by the angle between the plane P and a straight line between the respective inner and outer abutment surfaces and the respective inner and outer flange wedge surfaces. Said angles are positive in the sense that the vertex of said angles is closest to the annular groove (and not the wedge surfaces). In other words, it is the inner and outer abutment surface, which are the parts of the inner and outer heel surfaces closest to the annular groove, that will touch the cooperating structure first (before tightening of the bolts) when connecting two tubulars. Said tubulars having flange elements according to the invention mounted on their ends.

The wedge surface angle controls the rotation of inner and outer flange parts during the pre-loading of the bolts and has several advantages. The wedge surface angle makes the flange part warp like a disc spring during assembly of the flange connection and thereby the flange part is pre-stressed, dominated by hoop stresses. The warping pre-stress of the flange part ensures that the flange part does not loose contact outside the flange recess where the bolting is located, for any given tower design loads, which prevents water from penetrating into the annular opening formed by the flange recess and causing corrosion of the bolts arranged in bolt holes. Furthermore, the internal pre-stress of the flange part causes separating forces on the nuts that are screwed onto the bolts in a flange connection, whereby the nuts will not self-loosen due to vibrations or other dynamic loads. The bolt pre-stresses are static which provides superior fatigue properties. The static bolt stresses allow for higher bolt pre-stress and higher design load resistance of the flange element. Furthermore, there will be no prying effects on the bolts before flange separation occurs, which will happen when the loads exceed the design loads of the flange connection.

In yet another embodiment of the flange element the inner flange part comprises a plurality of inner bolt holes evenly distributed around the central axis A, and the outer flange part further comprises a plurality of outer bolt holes evenly distributed around the central axis A. The bolt holes extend in a direction substantially parallel to the central axis.

In yet another embodiment of the flange element the outer flange part comprises an outer annular recess positioned between the outer flange heel and the outer flange wedge wherein the plurality of outer bolt holes are positioned in the recesses and wherein the inner flange part further comprises an inner annular recess positioned between the inner flange heel and inner flange wedge wherein the plurality of inner bolt holes are positioned in the inner flange recess.

In yet another embodiment of the flange element the at least one annular groove comprises one annular groove extending in a direction parallel with the central axis A, from a position between the inner and outer front surfaces towards a position a distance from the attachment part.

In yet another embodiment of the flange element the width (W) of the annular groove at any given depth is at least: $W=D\times\sin(\beta1)+D\times\sin(\beta2)$, wherein D is the distance from the given depth to the inner end of the annular groove.

In yet another embodiment of the flange element the plurality of inner and outer bolt holes have an increased radius of $\Delta ri$ and $\Delta ro$, respectively, to ease insertion and allow rotation of the inner and outer flange parts (30, 31) without bending the bolts, wherein $\Delta ri$ for the inner bolt holes at least is: $\Delta ri=Ti\times\sin(\alpha1)$, and wherein $\Delta ro$ for the outer bolt holes at least is: $\Delta ro=To\times\sin(\alpha2)$, wherein Ti and To are the thicknesses of the inner and outer flange elements respectively and α1 and α2 are the inner and outer closing angles respectively.

In yet another embodiment of the flange element the annular groove extends at least halfway through, more preferably substantially two third of the way through from the inner and outer front surfaces toward the surface of the rear side.

In yet another embodiment of the flange element the at least one annular groove comprises an inner groove having a directional component inward, and an outer groove having a directional component outward and both grooves having a common opening between the inner and outer flange heel surfaces.

In yet another embodiment of the flange element the surface of the inner and outer section of the rear side has an angle to the plane P corresponding to the angles α1 and α2 of the inner and outer closing surfaces.

In yet another embodiment of the flange element a pressure test channel is extending from an outside surface of the flange element to a section of the annular groove that is fluidly isolated from the surroundings when the flange element is fully mounted.

In yet another embodiment of the flange element, the section of the annular groove is fluidly isolated from the surroundings when the flange element is fully mounted. The annular groove may be isolated from the surroundings by being blocked by a base element or by being fluidly connected only to an annular groove of a cooperating flange element. Often the annular groove will comprise one continuous groove, but in some embodiments a sectioned groove is conceivable.

In another aspect of the invention a method for connecting a flange element to a cooperating structure is described. The cooperating structure has an inner and outer ring of bolts mating with the bolt holes of the annular flange element. Examples of such cooperating structures can be a base element for connection to a first tubular of a wind turbine tower, or a bottom of a wind turbine housing designed for mounting at the top of a wind turbine tower. The method pertains to a flange element as described in point [0013] and comprises the steps of aligning the flange element and the cooperating structure such that the rings of bolts are aligned with the rings of bolt holes, and moving the flange element and the cooperating structure towards each other such that the inner and outer abutment surfaces contacts the cooperating structure and the rings of bolts have entered the rings of bolt holes. The method further comprises the step of tightening the bolts, such that the inner and outer wedge angles, γ 1 and γ 2), the inner and outer closing angles, α 1 and α2, and inner and outer heel angles, β1 and β2, all are zero.

In another aspect of the invention a method for connecting a flange element to a cooperating structure is described. The cooperating structure having an inner and outer ring of bolt holes mating with the bolt holes of the flange element. Preferably the cooperating structure is an annular flange element according to the invention as described in point [0013]. Conceivably the cooperating structure is a prior art flange connection with matching bolt holes The method comprises the steps of aligning the flange element and the cooperating structure such that the rings of bolt holes of the flange element are aligned with the rings of bolt holes of the cooperating structure, moving the flange element towards the cooperating structure such that the inner and outer abutment surfaces contacts the cooperating structure, and entering bolts into the bolt holes. The method further comprises the step of tightening the bolts, such that the inner and outer wedge angles, α1 and α2), the inner and outer closing angles, γ1 and γ2, and inner and outer heel angles, β1 and β2, all are zero.

In another aspect of the invention a method for testing the integrity of a connection between the flange element and a cooperating structure is described At least a section of the annular groove must fluidly isolated from the surroundings. The method comprises the steps of supplying pressure to the section of the annular groove through the pressure test channel until the pressure in the annular groove reaches a predetermined test pressure and observe if the pressure drops with time.

BRIEF DESCRIPTION OF THE DRAWINGS

In order to enhance understanding of the invention drawings are provided wherein the same reference numbers are used to denote the same features in all the drawings.

DETAILED DESCRIPTION

In the following we will describe an annular flange element 20 according to the invention using words like outward and outermost which in this text relates to the radial direction outward from a central axis A of the flange element shown in FIGS. 10 *a* and *b*. Inward and innermost relates to a radial direction towards the central axis A. The central axis A goes through a center point of the annular shape described by the flange element and extends in a longitudinal direction.

Figure 11A:
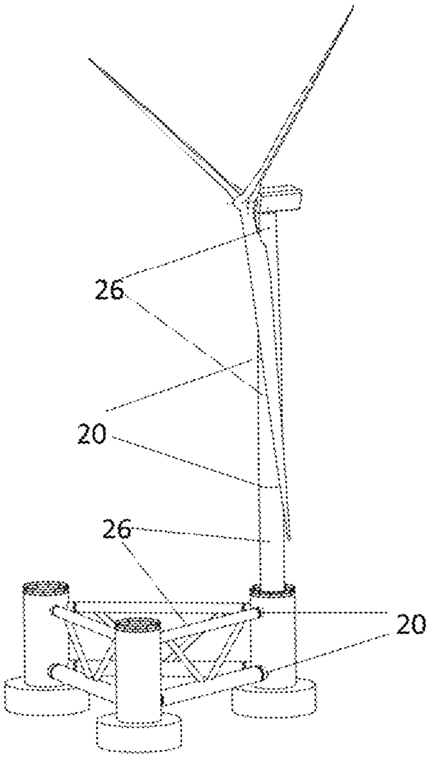
FIGS. 11*a* and *b* shows a wind turbine and floating structure suitable for using the flange element according to the invention to connect tubular parts.
Figure 11B:
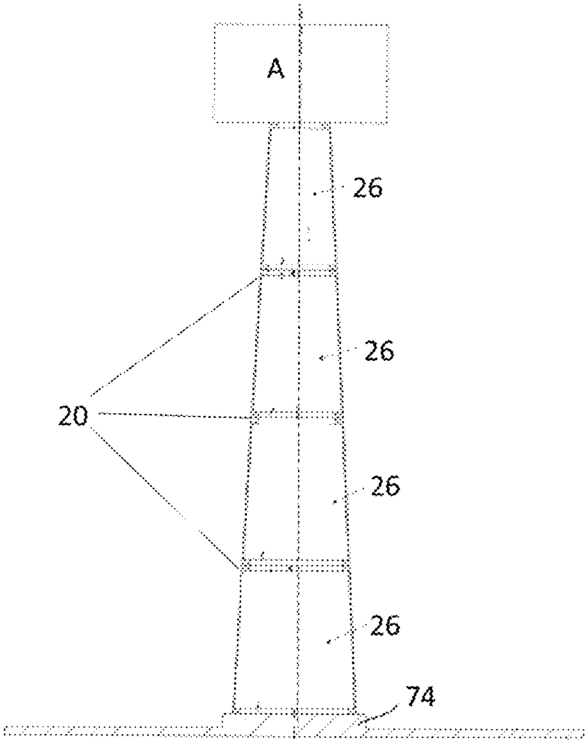

The invention relates to an annular flange element 20 for connection of tubular elements. Primarily, the flange element is designed for large tubulars like tubulars for offshore wind turbines exposed to large dynamic forces from wind and wave action. Examples of this can be seen in FIGS. 11 *a* and *b*

Figure 1:
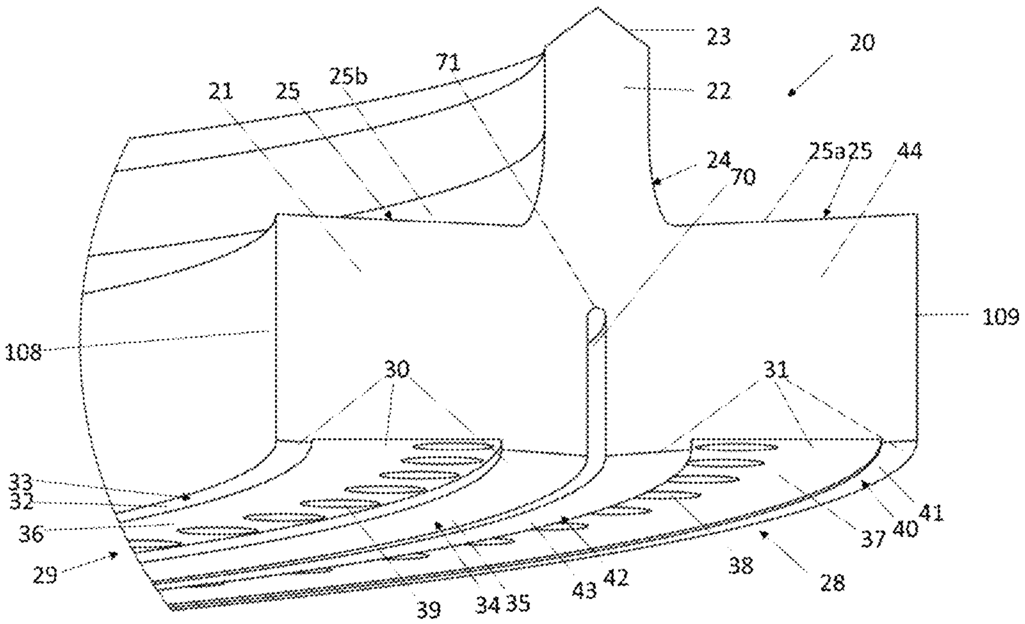
FIG. 1 shows a radial cross section of the flange element according to the invention.
Figure 10A:
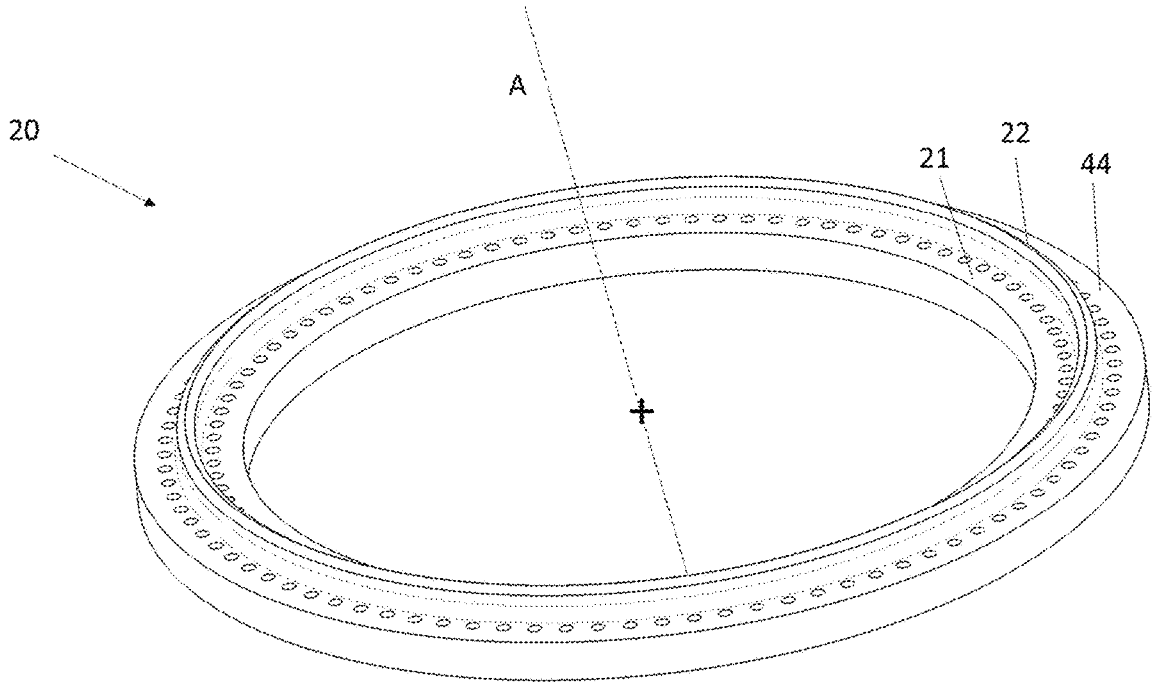
FIG. 10 *a* and *b* shows a rear side and front side of a complete flange element according to the invention.
Figure 10B:
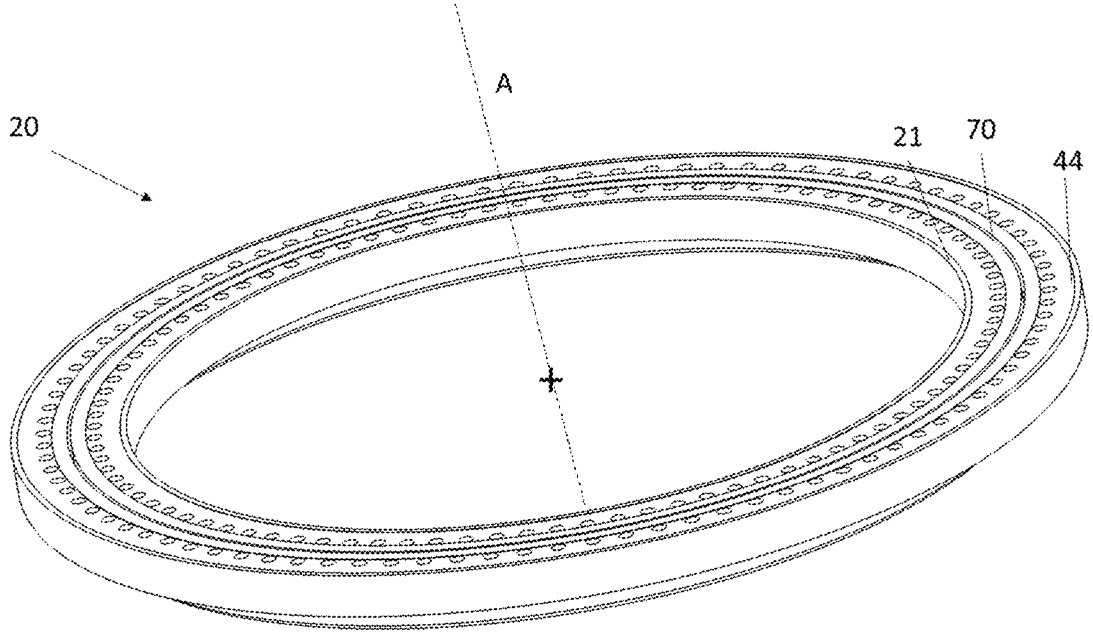

The annular flange element 20, shown in FIG. 1, comprises a central axis A indicated in FIGS. 10*a* and 10*b*, and to ease the language for describing the flange element we define an outer periphery 108 and an inner periphery 109, which simply are the outermost and innermost surfaces of the flange element. By annular we mean any shape describing a complete loop. It could be a circle, an oval, a polygon or other shapes.

The annular flange element 20 comprises an outer flange part 44 extending radially outward toward the outer periphery 109, the outer flange part 44 comprises an outer rear section 25*a* of a rear side 25 and an outer front side 28 with an outer front surface 31 for connection to a cooperating structure.

The annular flange element further comprises an inner flange part 21 extending radially inward toward the inner periphery 108. The inner flange part 21 comprises an inner rear section 25*b* of the rear side 25 and an inner front side 29 with an inner front surface 30 for connection to the cooperating structure. The rear side 25, comprising the inner rear section 25*b* and the outer rear section 25 *a*, is facing in a direction opposite the inner and outer front surfaces, which are the surfaces contacting the cooperating structure when the flange element 20 is connected to the cooperating structure.

The annular flange element further comprises an attachment part 22 extending from the rear side 25 in a direction substantially opposite the inner and the outer front surface 30, 31, the attachment part being adapted for secure attachment to a tubular element. Preferably, the attachment part comprises at least one weld bevel 23, but preferably two weld bevels, that extend partly or, preferably, around the entire circumference of the flange element. The attachment part can thereby be welded to a tubular element.

The inner and outer flange parts 21, 44 are partially divided by at least one annular groove 70 extending between the inner and outer flange parts 21, 44 from a position between the inner and outer front surfaces 30, 31 towards a position a distance from the attachment part 22. The purpose of the annular groove 70 is to provide more flexibility to the inner and outer flange parts 21, 44, which in turn enables a more even distribution of clamping force on the inner and outer front surfaces. Preferably the at least one annular groove is one annular groove 70 extending from a position between the inner and outer front surfaces 30, 31 towards a position a distance from the attachment part 22 in a direction parallel with the central axis A In a preferred embodiment at least parts of the outer front surface 31 and the inner front surface 30 have a non-zero angle to a plane, P, perpendicular to the central axis A. The groove 70 is configured to allow flexible movement between the inner and outer front surfaces, such that the non-zero angle of the inner and outer front surfaces relative to the plane P may change from non-zero to zero during connection to the cooperating structure.

In a preferred embodiment, shown in FIGS. 1 and 2 the outer flange part 44 further comprises an outer flange wedge 40 comprising an outer flange wedge surface 41 positioned on an outermost section of the outer front surface 31. The flange part further comprises an outer flange heel 42 comprising an outer flange heel surface 43 that is positioned on an innermost section on the outer front surface 31.

In a preferred embodiment the inner flange part 21 further comprises an inner flange wedge 32 comprising an inner flange wedge surface 33 that is positioned on an innermost section of the inner front surface 30, and the flange part further comprises an inner flange heel 34 comprising an inner flange heel surface 35 that is positioned on an outermost section of the inner front surface 30.

Figure 2A:
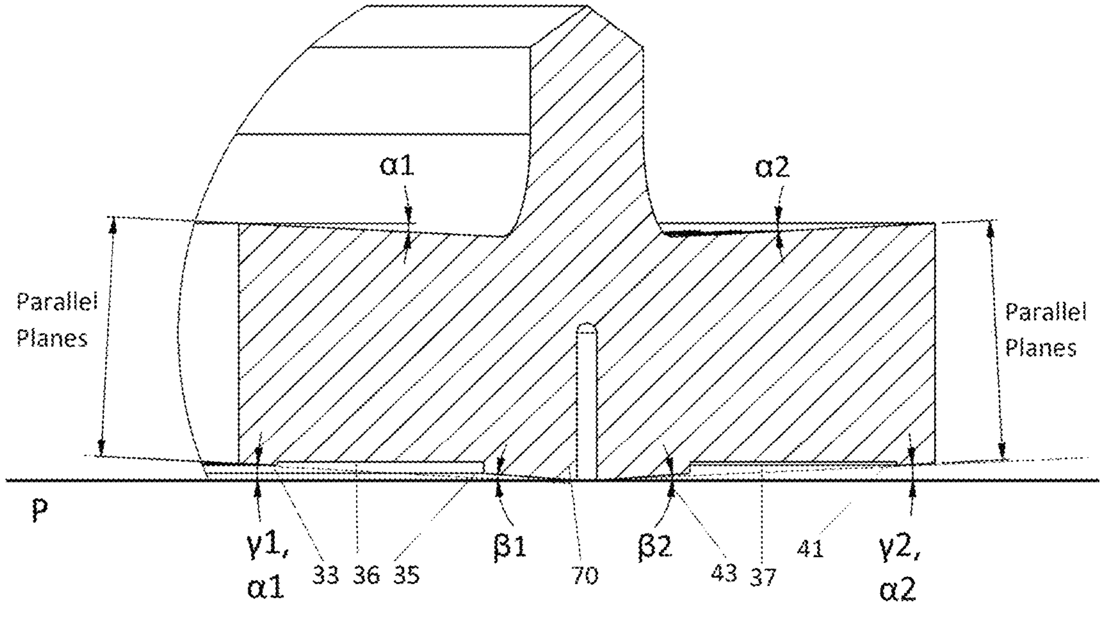
FIG. 2*a* shows a radial cross section of an embodiment of the flange element where important angles are indicated and where wedge surface angles and closing angles are the same.
Figure 2B:
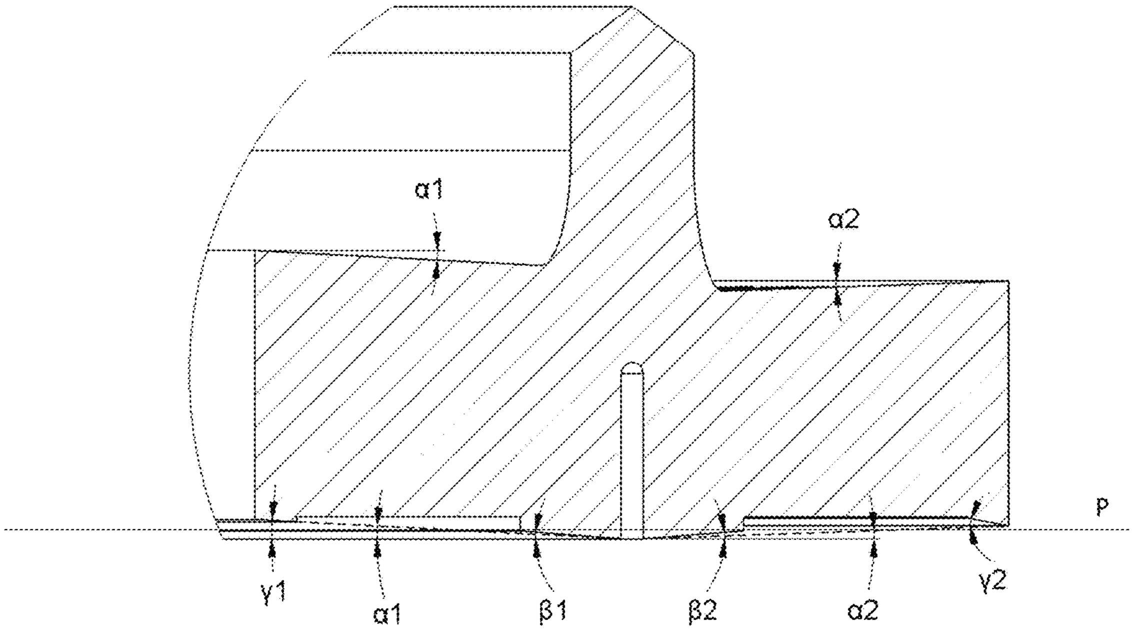
FIG. 2*b* shows a radial cross section of an embodiment of the flange element where the wedge surface angle and the flange closing angles are different.
Figure 3:
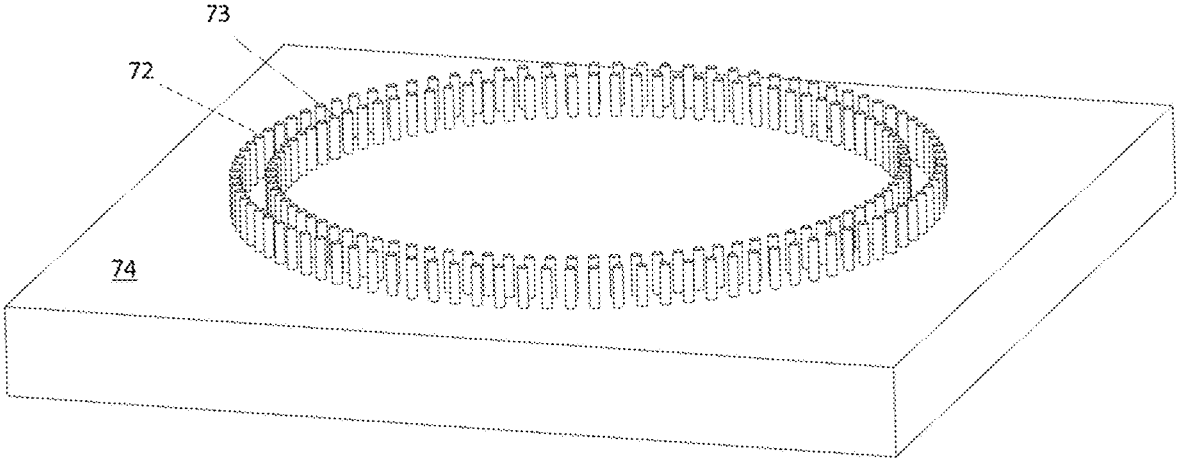
FIG. 3 shows an embodiment of a base element onto which an embodiment of the flange element can be fastened.

As illustrated in FIGS. 2*a* and 2*b*, the inner flange wedge surface 33 and the outer flange wedge surface 41 make respective wedge surface angles $\gamma 1$ and $\gamma 2$ with the plane P, and the inner flange heel surface 35 and outer flange heel surface 43 make respective heel surface angles $\beta 1$ and $\beta 2$ with the plane P. Furthermore, the inner and outer flange part have an inner and outer flange closing angle, $\alpha 1$ and $\alpha 2$, which is defined by the angle between the plane P and a straight line from the respective inner and outer abutment surfaces 45, 46 to the respective inner and outer wedge surfaces 33, 41. In some embodiments the wedge surface angles and the flange closing angles are the same as seen in FIG. 2*a*. In other embodiments, seen in FIG. 2*b* the wedge surface angle and flange closing angles are different. For instance, to ensure permanent and strong closure of two connected outer flange wedges to avoid penetration of salt water to the bolts, an outer flange wedge surface angle $\gamma 2$, as seen in FIG. 2*b* could be applied.

In a preferred embodiment the inner flange part 21 comprises a plurality of inner bolt holes 39 evenly distributed around the central axis A, and the outer flange part 44 further comprises a plurality of outer bolt holes 38 evenly distributed around the central axis A. The outer flange part 44 further comprises an outer annular recess 37 positioned between the respective outer flange heel 42 and outer flange wedge 40, wherein the plurality of outer bolt holes 38 are positioned in the outer annular recess. The inner flange part 44 further comprises an inner annular recess 36 positioned between the inner flange heel 34 and inner flange wedge 32, wherein the plurality of inner bolt holes 39 are positioned in the inner flange recess 36.

In order to reduce the prying effect on the bolts 72, 73 and to increase the static window of the bolted connection the bolts and bolt holes should be as close to the center of the flange element 20 as possible. In a preferred embodiment the radial width of the flange heel surfaces 35, 43 should be less than the thickness of the tubular walls and the radial width of the flange wedge surfaces 33, 40 should be less than half of the flange heel surfaces 35, 43. The thickness of the inner and outer flange parts 21, 44 (in a direction parallel to the central axis A) should be at least as thick as the tubular walls, preferably between 1.5 and 2.5 times as thick as the tubular walls in the tubulars that are to be connected.

Figure 4:
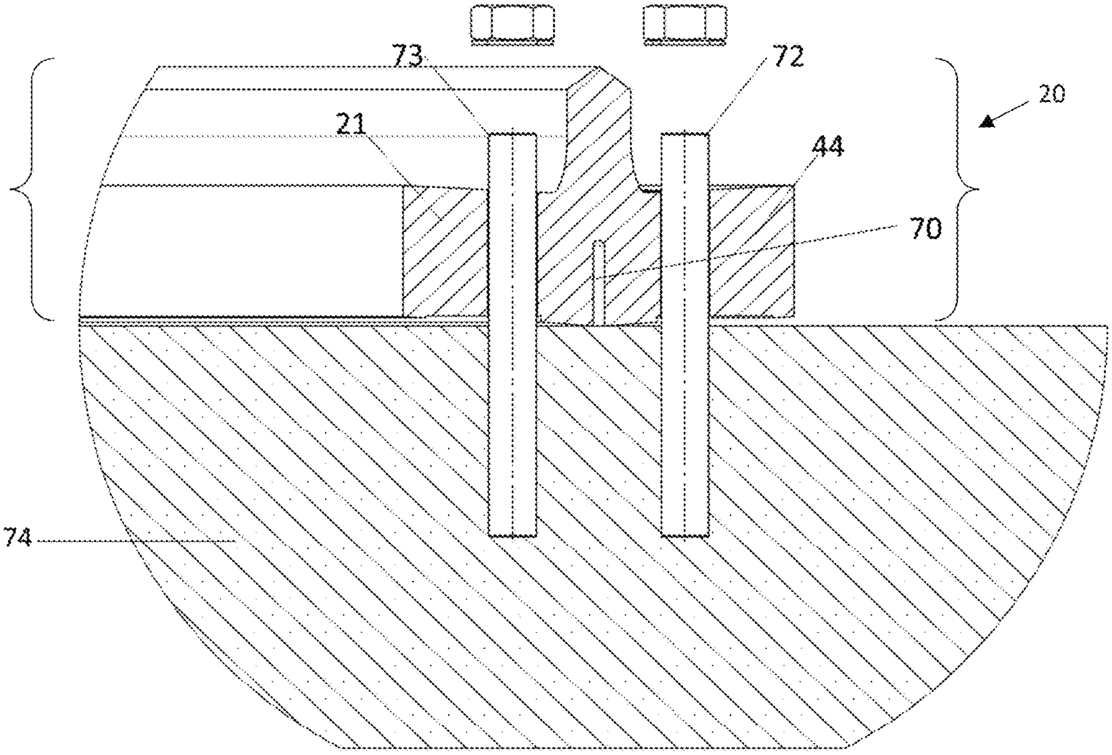
FIG. 4 shows a cross section of a flange element resting on a base element before the bolts are tightened.
Figure 5:
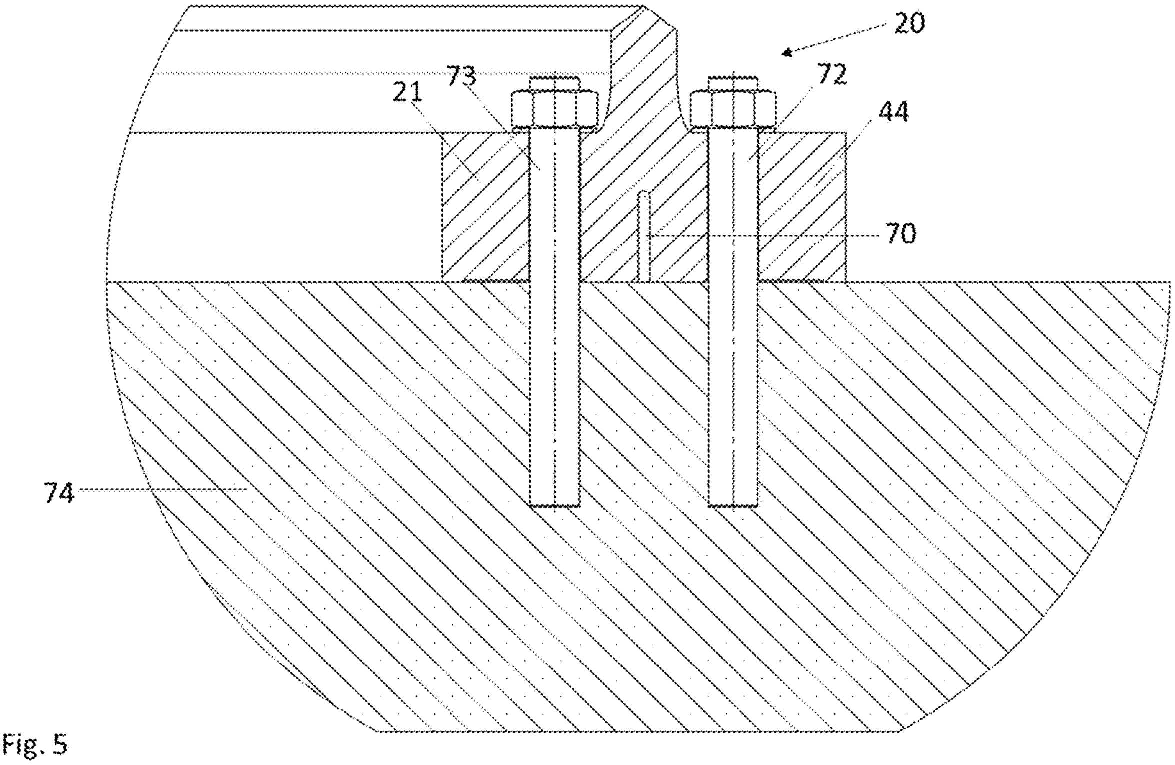
FIG. 5 shows a cross section of the flange element of FIG. 4 after the bolts are tightened.
Figure 6:
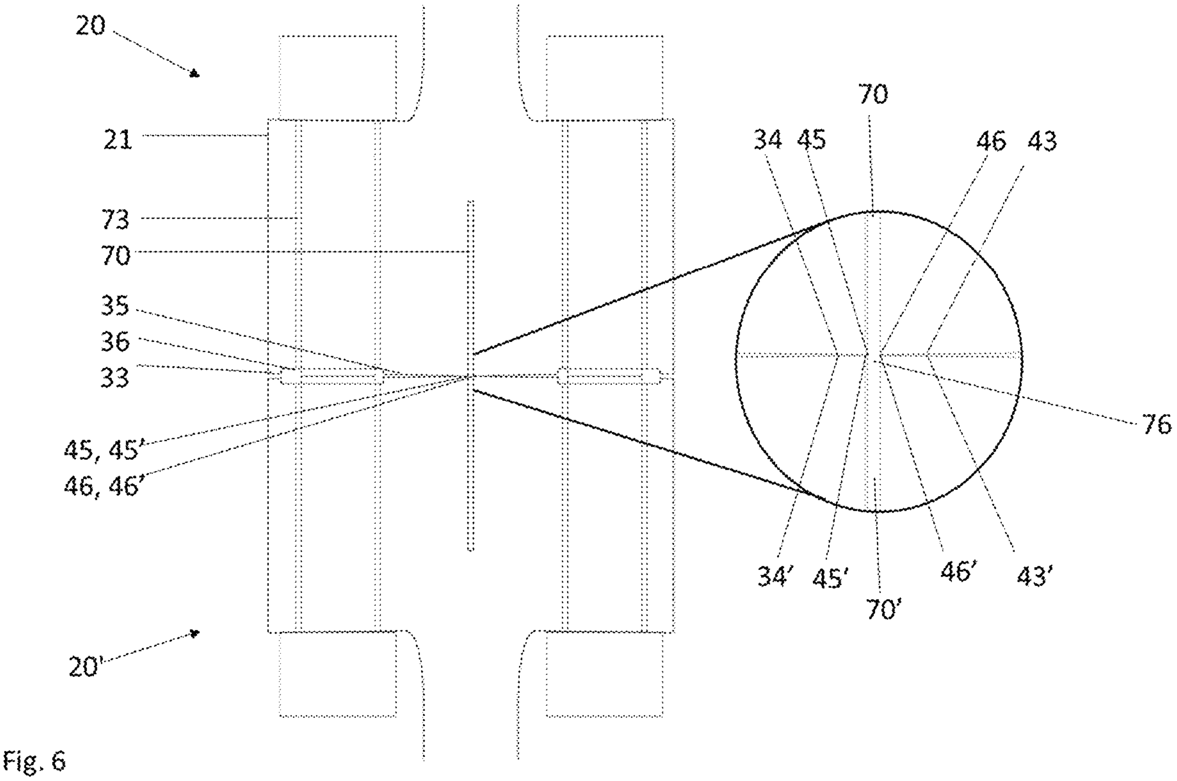
FIG. 6 shows a cross section of two flange elements mounted together prior to the final tightening of the bolts.
Figure 7A:
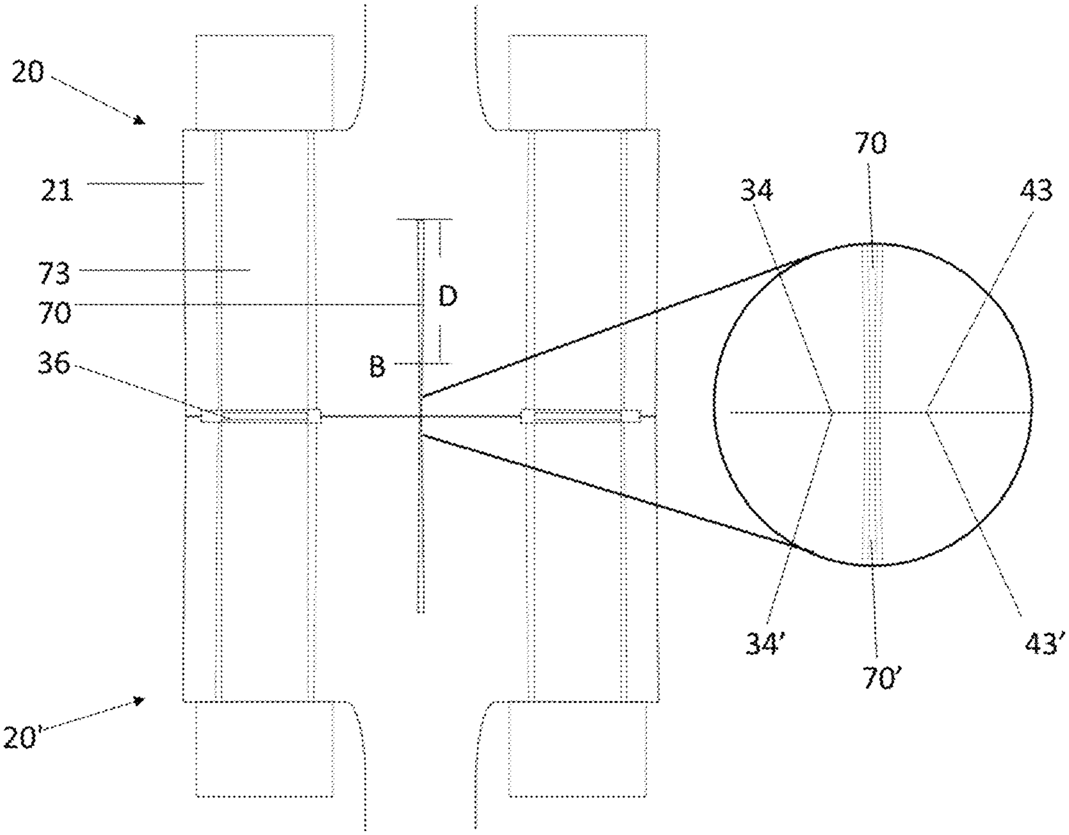
FIG. 7*a* shows the cross section of the two flange elements of FIG. 6 after the bolts have been tightened.
Figure 9:
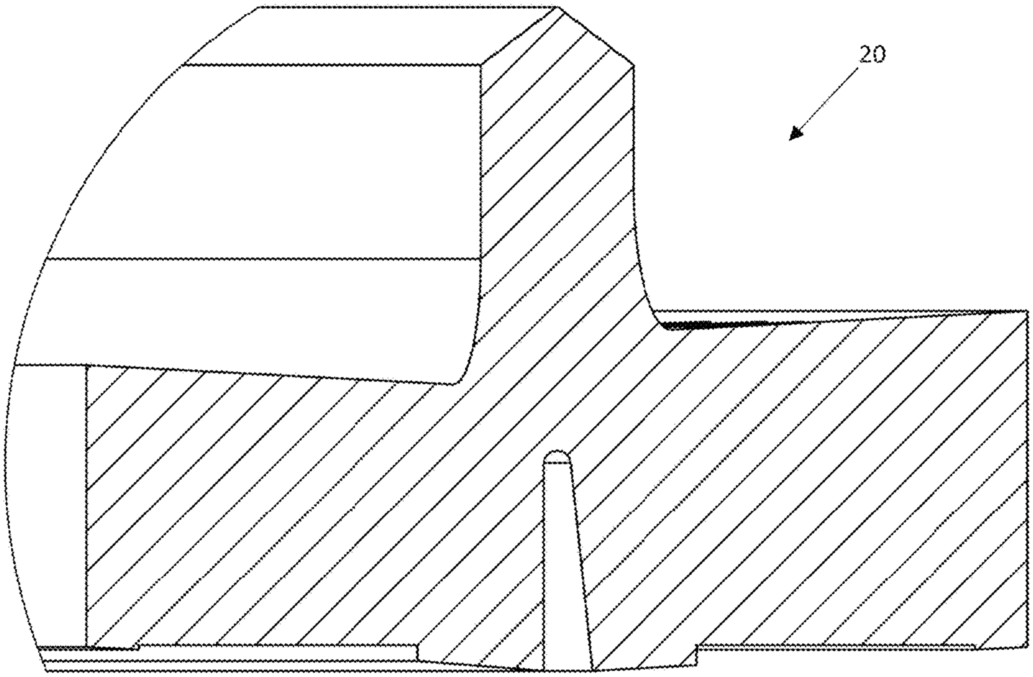
FIG. 9 shows an embodiment of the flange element having inner and outer flange parts with different properties.

In most cases the cooperating structure to which a flange element 20 according to the invention is connected to is another flange element as shown in FIGS. 6 and 7*a*. Alternatively the flange element could be connected to a base element which have a planar contact surface for contact with the flange element as shown in FIGS. 4 and 5. Normally, the inner and outer flange closing angles, $\alpha 1$ and $\alpha 2$ and the inner and outer wedge angles are larger than 0 degrees and lie in the range from 0.1° to 3°. The inner and outer heel surface angles $\beta 1$ and $\beta 2$ respectively are larger than 0 degrees and would normally be in the range 0.15° to 5° degrees. It should be noted that in many cases the inner flange part 21 is different from the outer flange part 44 both with respect to flange thickness, flange width, bolt configuration, including bolting material, bolt diameter and number of bolts, and wedge surface angles and heel surface angles. Such an embodiment is shown in FIG. 9. This is due to different exposures relating to moisture, salt, UV, temperatures and forces from weather and operation of the wind turbine, as well as practical matters with respect to handling, installing and pre-loading the bolts.

FIG. 4 shows one flange element 20 positioned onto bolts extending from a base element 74 with the bolts tightened, and FIG. 5 shows the flange element of FIG. 4 before tightening the bolts.

FIG. 6 shows two flange elements according to the invention, prior to tightening of the bolts, touching only with the inner and outer abutment surfaces 45, 46 and 45', 46'. The parts of the cooperating structure (in this case a flange element) have the same reference numerals but are marked with an apostrophe. The angles are rather small and are more clearly illustrated in FIGS. 2*a* and *b*. As the plurality of bolts are tightened, the annular groove 70 and the cooperating annular groove 70' will allow the respective inner and outer flange part 21, 44 and their cooperating counterparts 21' and 44' to move synchronously until the inner flange wedge surface 33 abuts the cooperating counterpart 33' as is shown in FIG. 7. Although the angles are small it is possible to see that the sides of the annular flexible groove are curved and are close to touching the opposite side near the inner and outer abutment surfaces 45, 46. The minimum width, W, of the annular flexible groove at any given position, B, inside the annular groove 70 must be sufficiently wide to allow this movement to take place. FIG. 8 illustrates these relations. During tightening of the bolts each flange part rotates around respective rotational regions marked with an R in FIG. 8. The width, W, will be fairly close to the distance, D, from the given position, B inside the annular groove 70 to an inner end 71 of the annular groove times sine of $\beta 1$ plus the distance, D, from the given position, B inside the annular groove 70 to an inner end 71 of the annular groove times sine of $\beta 2$. More precisely: $W=D\times\sin(\beta 1)+D\times\sin(\beta 2)$, wherein $\beta 1$ and $\beta 2$ are the inner and outer flange heel surface angle respectively.

Preferably, the inner section 25*a* of the rear side 25 have the same angle, $\alpha 1$, with the plane P as the inner flange closing angle, and similarly, the outer section 25*b* of the rear side 25 have the same angle, $\alpha 2$, with the plane P as the outer flange closing angle. This will cause the nuts that is fastened to the bolts or the boltheads to have a horizontal position on the surface of the rear side 25 and the cooperating rear side 25' when the inner or outer flange wedge surface 33, 41 abuts the cooperating inner and outer flange wedge surfaces 33', 41'. The depth of the annular groove 70 should be deep enough and the width of the annular groove 70 should be wide enough to allow these movements to take place. The groove end 71 should be positioned between the middle of the flange parts and the rear side 25. More preferably the inner groove end is positioned to thirds of the way towards the rear side 25, which is equivalent to two thirds of the way towards the attachment part 22.

Figure 7B:
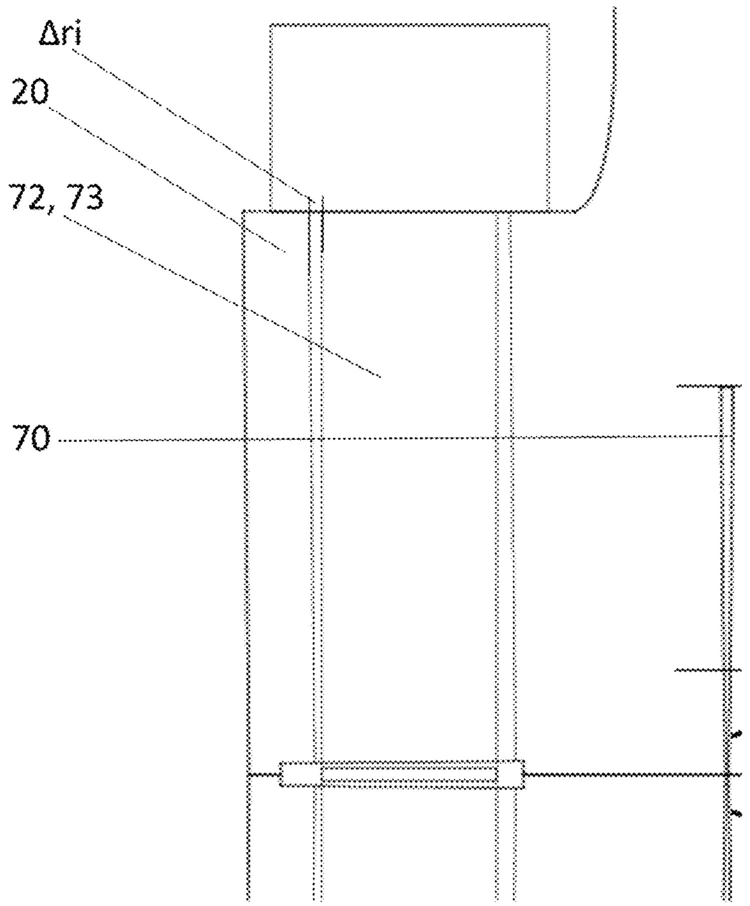
FIG. 7*b* shows the increased radius of the bolt holes.
Figure 8:
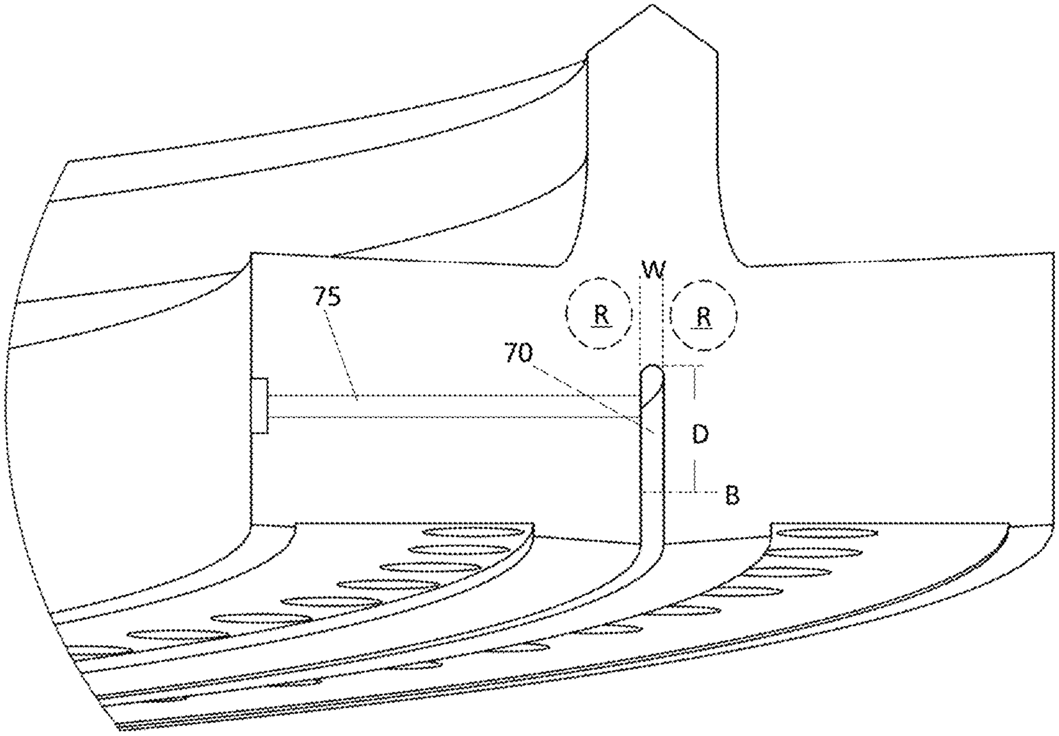
FIG. 8 shows an embodiment of a pressure test channel for testing the pressure in the annular groove cavity.

In a preferred embodiment, shown in FIG. 7*b*, the plurality of inner and outer bolt holes 38, 39 have an increased radius of $\Delta ri$ and $\Delta ro$ respectively, to allow rotation of the respective inner and outer flange parts 21, 44 without bending the bolts, as the bolt holes will change angles when the bolts are tightened. The extra width is also needed to insert the bolts into the bolt holes of the flange element and the cooperating flange element. $\Delta ri$ for the inner bolt holes 39 is at least: $\Delta ri=Ti\times\sin(\alpha 1)$, and $\Delta ro$ for the outer bolt holes 38 at least is: $\Delta ro=To\times\sin(\alpha 2)$, wherein Ti and To are the thicknesses of the inner and outer flange elements (30, 31) respectively and $\alpha 1$ and $\alpha 2$ are the inner and outer closing angles respectively, which are clearly indicated in FIGS. 2*a* and 2*b*.

In an embodiment the at least one annular groove 70 comprises an inner annular groove 77 slanted inward and an outer annular groove 78 slanted outward having a common opening between the inner and outer flange heel surfaces 35, 43. The two grooves will form a V-shape and should have steep angles to the plane P, which is perpendicular to the central axis A.

In an embodiment the flange element comprises a pressure test channel 75 extending from an outside surface of the flange element 20 to an annular groove 70 that is fluidly isolated from the surroundings when the flange element is fully mounted, and the bolts tightened. The annular groove can be blocked by a base element 74 or is fluidly connected to the annular groove 70' of the cooperating flange element 20' forming a fluidly isolated cavity of the two annular grooves 70, 70'. If the annular cavity cannot hold a pressure that is supplied to the annular groove cavity 76 the operator will know that the integrity of the flange connection is compromised and bolts 38, 39 and flange elements 20, 20' are exposed to degradation.

Below is described a method for connecting a flange element 20 to a cooperating structure having an inner and outer ring of bolts 73', 72' mating with the bolt holes 39, 38 of the flange element. The method pertains to a flange element according to the invention, wherein the outer flange part comprises an outer flange wedge 40 comprising an outer flange wedge surface 41 positioned on an outermost section of the outer front surface 31, and an outer flange heel 42 comprising an outer flange heel surface 43 that is positioned on an innermost section of the outer front surface 31. Furthermore the method pertains to the flange element wherein the inner flange part 21 comprises an inner flange wedge 32 comprising an inner flange wedge surface 33 that is positioned on an innermost section of the inner front surface 30, and an inner flange heel 34 comprising an inner flange heel surface 35 that is positioned on an outermost section of the inner front surface 30. The inner and outer flange wedge surface 33, 41 makes a wedge surface angle γ 1 and γ 2, respectively, with the plane P, and the inner and outer flange heel surface 35, 43 makes an inner and outer heel surface angle β1 and β2, respectively, with the plane P, and wherein inner and outer flange closing angles, α1 and α2, are defined by the angle between the plane P and a straight line between the respective inner and outer abutment surface 45, 46 and the respective inner and outer flange wedge surfaces 33, 41.

The method comprises a step of aligning the flange element 20 and the cooperating structure such that the rings of inner and outer bolts 73, 72 are aligned with the rings of inner and outer bolt holes 39, 38.

A step of the method is moving the flange element 20 towards the cooperating structure (or vice versa) such that the inner and outer abutment surfaces 45, 46 contacts the cooperating structure and the rings of bolts 73', 72' have entered the rings of bolt holes 38, 39.

A step of the method is to tighten the bolts, such that the inner and outer flange closing angles (α1, α2), the inner and outer wedge angles (γ 1, γ 2) and inner and outer heel angles (β1, β2) all are zero or close to zero.

Below is described a method for connecting a flange element 20 as described in previous section [0062] to a cooperating structure having an inner and outer ring of bolt holes 39', 38' mating with the inner and outer bolt holes 39, 38 of the flange element. In a preferred embodiment the cooperating structure is a flange element according to the invention. The method comprises a step of aligning the flange element 29 and the cooperating structure such that the rings of inner and outer bolt holes (39, 38) are aligned with the rings of inner and outer bolt holes (39', 38') of the cooperating structure, A step of the method is moving the flange element towards the cooperating structure such that the inner and outer abutment surfaces (45, 46) contacts the cooperating structure, A step of the method is entering the bolts into the bolt holes, A step of the method is tightening the bolts, such that the inner and outer closing angles (α1, α2), the inner and outer wedge angles (γ 1, γ 2) and inner and outer heel angles (β1, β2) all are zero or close to zero.

Below is described a method for testing the integrity of a connection between the flange element 20 according to the invention and a cooperating structure.

A step of the method is to supply pressure to the annular groove 70 through the pressure test channel 74 until the pressure in the annular groove reaches a predetermined test pressure, and then, in another step, observe if the pressure drops with time. If the pressure does not drop, the integrity of the connection between the flange element 20 according to the invention and a cooperating structure is intact.

REFERENCES

20 T-flange element
21 Inner flange part
22 Attachment part
23 Weld bevel
24 Elliptical transition region
25 Rear side
25*a* Inner section of rear side
25*b* outer section of rear side
26 Tubular element
28 Outer front side
29 Inner front side
30 Inner front surface
31 Outer front surface
32 Inner flange wedge
33 Inner flange wedge surface
34 Inner flange heel
35 Inner flange heel surface
36 Inner flange recess
37 Outer flange recess
38 Outer bolt hole
39 Inner bolt hole
40 Outer flange wedge
41 Outer flange wedge surface
42 Outer flange heel
43 Outer flange heel surface
44 Outer flange part
45 Inner abutment surface
46 Outer abutment surface
70 Flexibility groove
71 Groove end
72 Outer bolts
73 Inner bolts
74 Tower base
75 Pressure test channel
76 Annular groove cavity
108 Inner periphery
109 Outer periphery

The invention claimed is:

1. An annular flange element for connection of tubular elements, the flange element comprising:
   an inner periphery arranged around a central axis,
   an outer periphery arranged around the central axis,
   an outer flange part extending radially outward toward the outer periphery, the outer flange part comprising an outer section of a rear side and an outer front side with an outer front surface for connection to a cooperating structure, an inner flange part extending radially inward toward the inner periphery, the inner flange part comprising an inner section of the rear side and an inner front side with an inner front surface for connection to the cooperating structure, and an attachment part extending from the rear side in a direction opposite the inner front surface and the outer front surface the attachment part being adapted for secure attachment to a tubular element, and wherein the inner and outer flange parts are partially divided by at least one annular groove extending between the inner and outer flange parts from a position between the inner front surface and the outer front surface towards a position a distance from the rear side, wherein the inner flange part and the outer flange part extend radially inward and outward, respectively, from the attachment part.

2. The flange element according to claim 1, wherein at least parts of the outer front surface and the inner front surface have a non-zero-degree angle to a plane, perpendicular to the central axis.

3. The flange element according to claim 2, wherein the at least one annular groove is configured to allow flexible movement of and between the inner front surface and the outer front surface, such that the non-zero-degree angle of the inner front surface and the outer front surface relative to the plane changes from non-zero degrees to zero degrees during connection to the cooperating structure.

4. The flange element according to claim 3, wherein the annular groove is arranged such that the attachment part is in a fixed position during the movement of the inner front surface and the outer front surface when connected to the cooperating structure.

5. The flange element according to claim 1, wherein the outer flange part further comprises:

an outer flange wedge comprising an outer flange wedge surface positioned on an outermost section of the outer front surface, and an outer flange heel comprising an outer flange heel surface that is positioned on an innermost section of outer front surface, and the inner flange part further comprises:

an inner flange wedge comprising an inner flange wedge surface that is positioned on an innermost section of the inner front surface, and an inner flange heel comprising an inner flange heel surface that is positioned on an outermost section of the inner front surface, and wherein the inner flange wedge surface and the outer flange wedge surface makes a first wedge surface angle and a second wedge surface angle, respectively, with the plane, and the inner and outer flange heel surface makes an inner heel surface angle and an outer heel surface angle, respectively, with the plane, wherein an inner abutment surface and an outer abutment surface are each positioned near the annular groove on respective sides of the annular groove, wherein an inner flange closing angle is defined between the plane and a straight line between the inner abutment surface and the inner flange wedge surface, and wherein an outer flange closing angle is defined between the plane and the straight line between the outer abutment surface and the outer flange wedge surface.

6. The flange element according to claim 5, wherein the outer flange part comprises an outer annular recess positioned between the outer flange heel and the outer flange wedge, wherein the plurality of outer bolt holes are positioned in the recesses and wherein the inner flange part further comprises an inner annular recess positioned between the inner flange heel and inner flange wedge, wherein the plurality of inner bolt holes are positioned in the inner flange recess.

7. The flange element according to claim 6, wherein the groove is arranged such that the attachment part is in a fixed position during the movement of the inner front surface and the outer front surface when connected to the cooperating structure, and wherein the plurality of inner and outer bolt holes have a radius of $\Delta ri$ and $\Delta ro$, respectively, to ease insertion of bolts and allow rotation of the inner and outer flange parts without bending the bolts, wherein $\Delta ri$ for the inner bolt holes at least is: $\Delta ri = Ti \times \sin(\alpha 1)$, and wherein $\Delta ro$ for the outer bolt holes at least is: $\Delta ro = To \times \sin(\alpha 2)$, wherein Ti is an inner thickness of the inner front surface and To is an outer thickness of the outer front surface and $\alpha 1$ is the inner flange closing angle and $\alpha 2$ is the outer flange closing angle.

8. The flange element according to claim 5, wherein a width of the annular groove at a given depth is at least: $W = D \times \sin(\beta 1) + D \times \sin(\beta 2)$, wherein D is a distance from the given depth to an inner end of the annular groove.

9. The flange element according to claim 5, wherein the surface of the inner and outer section of the rear side has an angle to the plane corresponding to the respective inner and outer flange closing angles.

10. A method for connecting a flange element according to claim 5 to a cooperating structure having an inner and outer ring of bolts mating with the bolt holes of the flange element comprising:

aligning the flange element and the cooperating structure such that the rings of bolts are aligned with the rings of bolt holes, moving the flange element and the cooperating structure towards each other such that the inner and outer abutment surfaces contacts the cooperating structure and the rings of bolts have entered the rings of bolt holes, tightening the bolts, such that the inner flange closing angle and the outer flange closing angle, the first wedge angle and the second wedge angle, and the inner and outer heel angles are each zero degrees.

11. The method for testing integrity of a connection between the flange element according to claim 10, and a cooperating structure comprising:

supplying a pressure to the annular groove through the pressure test channel until the pressure in the annular groove reaches a predetermined test pressure, and observing if the pressure drops with time.

12. A method for connecting a flange element according to claim 5 to a cooperating structure having an inner and outer ring of bolt holes mating with the bolt holes of the flange element comprising:

aligning the flange element and the cooperating structure such that the rings of bolt holes are aligned with the rings of bolt holes of the cooperating structure, moving the flange element towards the cooperating structure such that the inner abutment surface and the outer abutment surface contacts the cooperating structure, entering bolts into the bolt holes, tightening the bolts, such that the inner flange closing angle and the outer flange closing angle, the first wedge angle and the second wedge angle, and the inner and outer heel angles are each zero degrees.

13. The flange element according to claim 1, wherein the inner flange part comprises a plurality of inner bolt holes evenly distributed around the central axis, and the outer flange part further comprises a plurality of outer bolt holes evenly distributed around the central axis.

14. The flange element according to claim 1, wherein the at least one annular groove comprises one annular groove extending in a direction parallel with the central axis, from a position between the inner front surface and the outer front surface towards a position a distance from the attachment part.

15. The flange element according to claim 1, wherein the annular groove extends at least halfway through, more preferably substantially two-thirds of a way through from the inner front surface and the outer front surface toward the surface of the rear side.

16. The flange element according to claim 1, wherein a pressure test channel extends from an outside surface of the flange element to a section of the annular groove that is fluidly isolated when the flange element is fully mounted.

* * * * *